OR  3,857,629

United States
Freiser

[11] 3,857,629
[45] Dec. 31, 1974

[54] FAST TURN-OFF NEMATIC LIQUID OPTICAL DEVICES

[75] Inventor: Marvin J. Freiser, Scarborough, N.Y.

[73] Assignee: International Business Machines Corporation, Armonk, N.Y.

[22] Filed: May 14, 1973

[21] Appl. No.: 359,824

[52] U.S. Cl. .................................. 350/160 LC
[51] Int. Cl. ................................. G02f 1/28
[58] Field of Search ........ 350/160 LC; 252/408 LC; 23/230 LC

[56] References Cited
UNITED STATES PATENTS
3,697,150  10/1972  Wysocki .................. 252/408 LC X
3,718,382  2/1973  Wysocki et al. ............. 350/160 LC

OTHER PUBLICATIONS
"Deformation of Nematic L. C. w/vertical Orientation in Electrical Fields," by Schiekel, et al., A.P.L. A39-1-3, Vol. 19, No. 10, 11/15/71.
"Relaxation of the Dielectric Constant & Electrohydrodynamic Instabilities in a L.C.," by DeJen, et al., Phys. Ltr., Vol. 39A, No. 5 6/5/72 pgs. 355–356.

*Primary Examiner*—Ronald L. Wibert
*Assistant Examiner*—Paul K. Godwin
*Attorney, Agent, or Firm*—Isidore Match

[57] ABSTRACT

There is disclosed herein a novel nematic liquid crystal optical device of the type wherein the variation of the orientation and the index refraction of the nematic fluid is effected by means of an applied electric field. The device is disposed between crossed polarizers and, in operation, light passing through the device is extinguished when a sufficient voltage is applied to the device to align the bulk of the nematic fluid in the direction of the applied field, the cell being transmissive in the quiescent, parallel aligned state. The device is characterized by relatively fast relaxation times from the driven to the quiescent state, such characterization being imparted to the device by the use as the nematic fluid therein of a nematic material which is operative at room temperature and which has a reversal in sign of its dielectric anisotropy, i.e., a positive-negative dielectric anisotropy material. Such material is one which is constituted of molecules possessing a dipole moment at an angle to the long axis of the molecule, the latter angle depending upon the magnitude of the dipole moment and on the anisotropy of the electron polarizability of the molecule. Examples of such positive-negative anisotropy materials are those represented by the following general structural formula

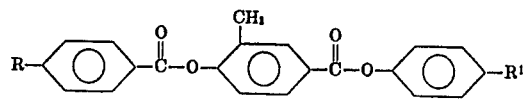

wherein R and R' are radicals selected from the group consisting of alkyl radicals having one to 12 carbon atoms.

3 Claims, 5 Drawing Figures

LIGHT

LIGHT

3,857,629

FAST TURN-OFF NEMATIC LIQUID OPTICAL DEVICES

BACKGROUND OF THE INVENTION

This invention relates to optical devices. More particularly, it relates to novel optical devices employing nematic liquid materials.

Among the many types of optical device utilizing nematic liquid crystal fluids, a commonly occurring type is one whose operation is based upon the utilization of an applied electric field to vary the index of refraction, and the orientation of the crystals in the nematic fluid.

A disadvantage presented in the use of such type of device is its slow relaxation from the driven to the quiescent state, this relaxation being driven by internal elastic forces and slowed by viscous forces in the nematic liquid medium.

In an attempt to overcome such disadvantage, i.e., to shorten the relaxation time, there has been resorted to the use of auxiliary electrodes which provide a field orthogonal to the driving field. However, the use of such auxiliary electrodes, in addition to being costly and introducing increased complexity, has been shown to be substantially ineffective where the optical device employing the nematic liquid is of the flat-film configuration.

It is readily apparent that the desirable optical device structure would be one in which no auxiliary electrodes need be employed.

Accordingly, it is an important object of this invention to provide a novel optical device employing a nematic liquid crystal material, such device being of the type wherein an applied electric field is used to vary the orientation of the index of refraction of the nematic liquid, and which has a substantially faster relaxation time from the driven to the quiescent state as compared to known optical devices of the same type.

It is another object to provide a novel optical device in accordance with the preceding object which does not require electrodes which are auxiliary to the applied field driving electrodes.

It is a further object to provide a novel optical device in accordance with the preceding objects which can be constructed in a flat-film configuration.

SUMMARY OF THE INVENTION

In accordance with the invention, there is provided a nematic fluid optical device which comprises a film of a nematic material contained between two transparent electrodes, the electrodes being adapted to having a potential source applied thereto. The resulting cell comprising the fluid contained between the two electrodes is disposed between crossed polarizers. The nematic fluid is one characterized by having a reversal sign in its dielectric anisotropy. Such fluid is one which is constituted by molecules possessing a dipole moment, an angle to the long axis of the molecule, the angle depending upon the magnitude of the dipole moment and on the anisotropy of the electronic polarizability of the molecule. Examples of nematic fluids having the reversal in sign of their dielectric anisotropy are those represented by the following general structural formula

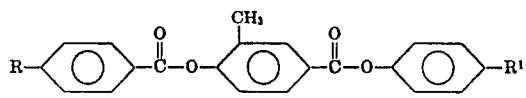

wherein R and R' are radicals selected from the group consisting of alkyl radicals having one to 12 carbon atoms.

The foregoing and other objects, features and advantages of the invention will be apparent from the following more particular description of a preferred embodiment of the invention, as illustrated in the accompanying drawings.

DESCRIPTION OF A PREFERRED EMBODIMENT

Figure 1:
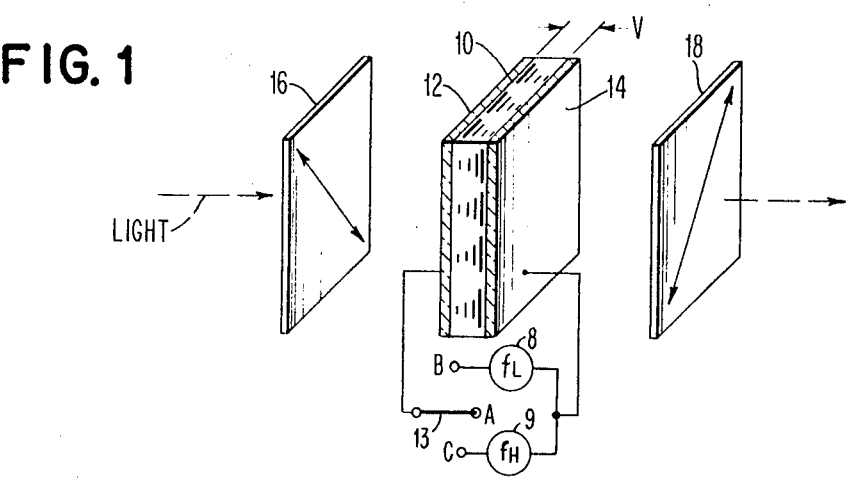
FIG. 1 is a schematic depiction of a twisted nematic optical device of the type where operation is based upon the variation of the orientation of the nematic fluid by means of an applied electric field, FIG. 1, illustrating the device in the state in which light is transmitted, the state being attained either by application of an a.c. electric field at a high frequency or the application of no electric field at all.
Figure 2:
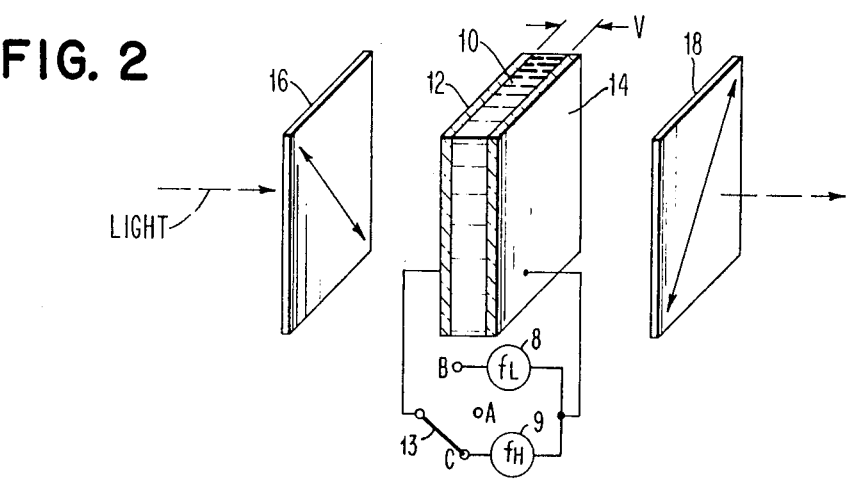
FIG. 2 is a depiction similar to that of FIG. 1 but shows the device with the low frequency or d.c. electric field applied thereto whereby there is an extinction of light.

In FIG. 1 there is illustrated the type of optical device employing a nematic fluid which is based upon the variation of the orientation and the index of refraction of the nematic fluid by means of an applied electric field. In this twisted nematic device, a nematic fluid film 10 is contained between two transparent electrodes 12 and 14. The surfaces of electrodes 12 and 14 are suitably treated to cause the optic axis of the film 10 to twist 90° as it goes from one surface to the other, when there is either no voltage or a voltage of frequency higher than the dielectric reversal frequency of the medium. Such surface alignment can be obtained, for example, by rubbing the surface in the desired direction of alignment (preferably with prior melting by a surface agent). Another method is to evaporate a film onto each surface with the beam impinging at a large angle with the perpendicular to the surface. The desired voltage is schematically depicted by voltage generators 8 and 9 with switch 13 on contact A or C, A being a no voltage condition and C being a high frequency condition. If the nematic fluid material constituting film 10 is chosen such that it has positive dielectric anisotropy at low frequency or d.c., then, when a sufficient voltage V of low frequency or d.c. is applied across film 10, i.e., by the placing of switch 13 in position B, as shown in FIG. 2, the optical axis of the bulk of the nematic fluid constituting film 10 aligns itself in the direction of the applied field as shown in FIG. 2. In this situation, when the cell constituted by electrodes 12 and 14 on film 10 and their associated voltage generators 8 and 9 is disposed between crossed polarizers 16 and 18, there results an extinction of light. A fast turn off of the cell is accomplished by placing switch 13 in the C or high frequency position. In the quiescent or A position, helical aligned state the cell is transmissive. In FIGS. 1 and 2, structure 16 is the polarizer component and structure 18 is the analyzer component of the polarizing optics.

As has been mentioned hereinabove, a disadvantage presented in the use of the prior art type of device similar to the device shown in FIGS. 1 and 2 is its slow relaxation time from the driven to the quiescent state, such relaxation being driven by internal elastic forces and slowed by viscous forces in the liquid medium. For example, a characteristic time for such relaxation is:

$$\tau = \gamma \, l^2/k \, \pi^2$$

where $\gamma$ is a viscosity, $k$ is an elastic constant, and $l$ is the thickness of the cell. Thus, typical values for nematic fluids which operate at room temperatures are $\gamma \sim 0.5$ poise, $k \sim 10^{-6}$ dyne. Thus, in a cell 20 $\mu$ thick, there is obtained a value for $\tau$ which is approximately 200 milliseconds.

FIG. 2 particularly illustrates the situation, using the same device as shown in FIG. 1, wherein the low frequency or d.c. voltage applied across film exceeds $V_c$, voltage $V_c$ having the value which is necessary to cause the optic axis of the nematic fluid constituting film 10 to align itself in the direction of the applied field.

As has been mentioned hereinabove, a technique for shortening the relaxation time of a device such as that shown in FIGS. 1 and 2 when it goes from the driven to the quiescent state is to employ auxiliary electrodes which provide a field orthogonal to the driving field. As has also been mentioned hereinabove, such technique presents the disadvantages of cost complexity and substantial ineffectiveness in the flat-film configuration, i.e., the configuration of the device depicted in FIGS. 1 and 2.

In accordance with the invention, there is employed as the nematic fluid constituting film 10 one whose dielectric anisotropy changes sign at some convenient frequency, $f_R$. Thus, with the providing of the device with only one set of electrodes such as those bearing the numerical designations 12 and 14 respectively, in FIGS. 1 and 2, the device is driven ON (with either d.c. or a.c. having a frequency $f < f_R$) or OFF (at an a.c. of a frequency $f > f_R$). the effect on the relaxation time is given by the expression:

$$\tau = \frac{\gamma l^2}{\frac{|\Delta\epsilon|}{4\pi} V_{rms}^2 + K\pi^2}$$

wherein, at a frequency greater than $f_R$, $\Delta\epsilon = \epsilon_{11} - \epsilon_1$ is negative. Thus, for example, if $|\Delta\epsilon| = 0.5$ and $V_{rms} = 120$ volts $= 0.4$ statvolt, there is obtained a reduction in the relaxation time from 200 milliseconds to 0.3 millisecond. In other words, with just one set of driving electrodes such as electrodes 12 and 14 in the device depicted in FIGS. 1 and 2, the optic axis can be driven into either one of two orthogonal directions.

It has been stated that materials capable of having a reversal in sign of their dielectric anisotropy in response to frequency are suitably employed as nematic fluid film 10. Examples of such materials are exemplified by those having the general structural formula

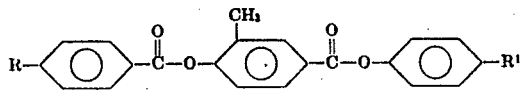

wherein R and R' are radicals selected from the group consisting of alkyl radicals having one to 12 carbon atoms.

Figure 3:
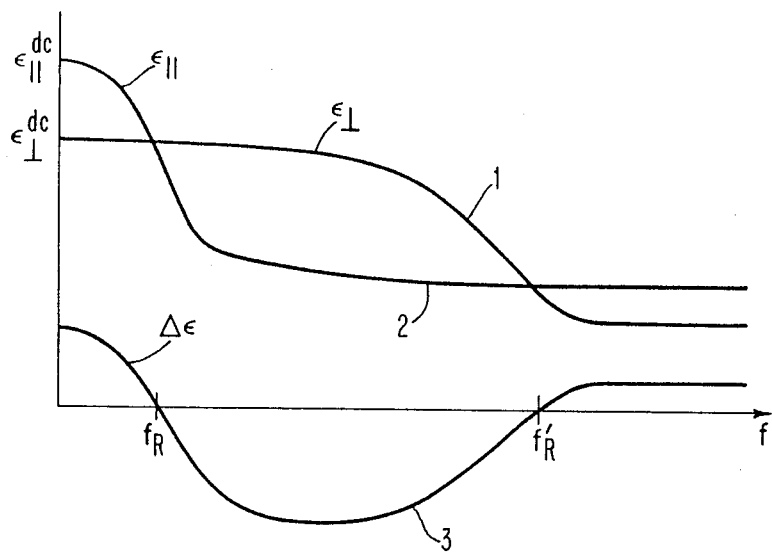
FIG. 3 is a group of curves illustrating the physical properties of a class of materials advantageously employed according to the invention.

In FIG. 3, there is shown a group of curves which illustrate the physical property of some nematic liquids that is exploited in this invention. Curves 1 and 2 in FIG. 3 show the principal components of the dielectric tensor (plotted vertically) as functions of frequency (plotted horizontally). Curve 3 in FIG. 3 gives the dielectric anisotropy, $\Delta\epsilon = \epsilon_{11} - \epsilon_1$, as a function of frequency. Curve 3 is the $\Delta\epsilon$ characteristic of the positive-negative anisotropy nematic material. It is seen in curve 3 that between frequencies $f_R$ and $f_R'$, $\Delta\epsilon$ is negative. At a frequency less than $f_R$, $\Delta\epsilon$ is positive and at a frequency exceeding $f_R'$, $\Delta\epsilon$ is also positive.

From the characteristics illustrated in the curves in FIG. 3, it can be inferred that for a molecule to have both positive and negative anisotropy, it has to possess a dipole moment at an angle to the long axis of the molecule, but not too large an angle (since in such case, the dc anisotropy would be negative). The desired angle of the dipole moment to the long axis of the molecule depends upon the magnitude of the dipole moment and upon the anisotropy of the electronic polarizability of the molecule. The methylated diesters are examples of materials for which $f_R'$, i.e., the frequency at which the sign reversal occurs in the above exemplified positive-negative anisotropy room temperature nematic materials is about 1 kHz.

Figure 4:
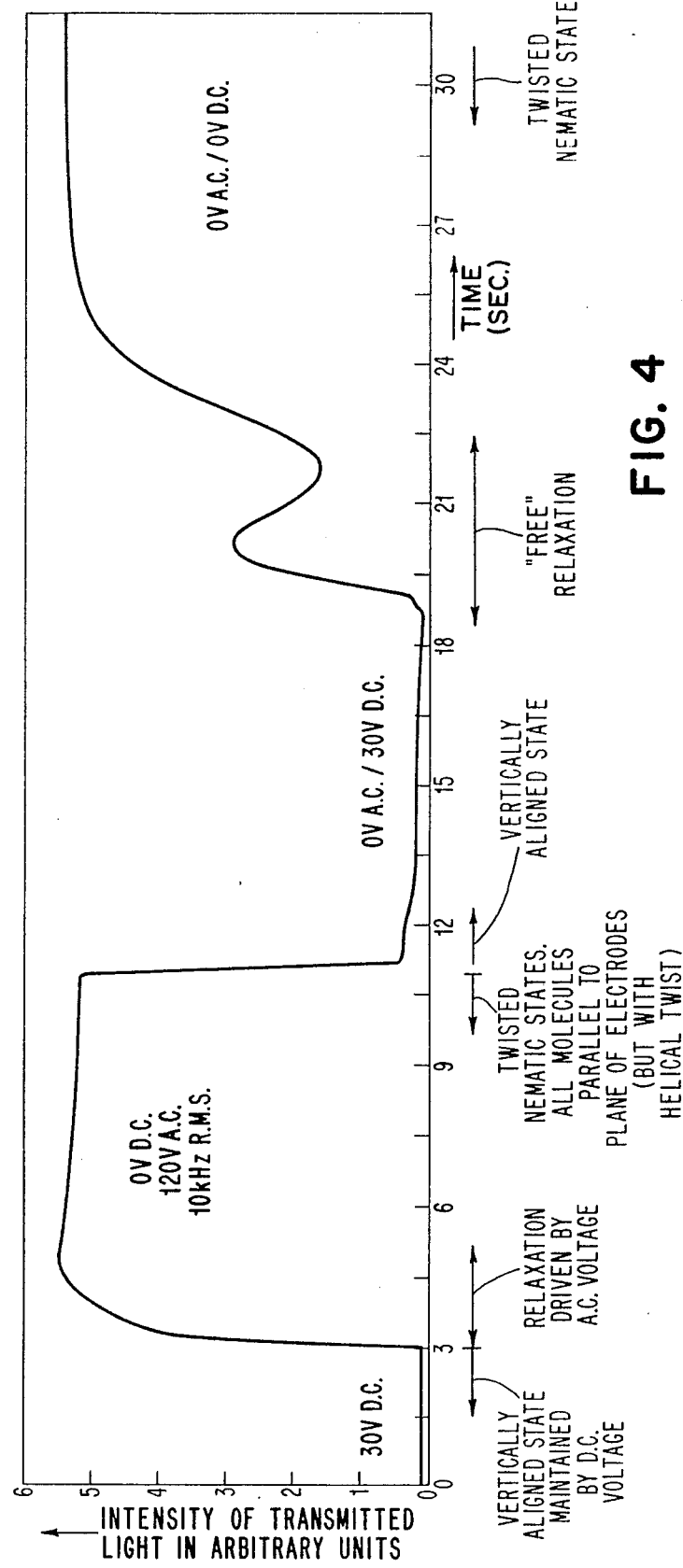
FIG. 4 is a trace illustrating the operation of the invention.

FIG. 4 is a strip chart trace for a twisted nematic cell (surfaces at 90° to each other) disposed between crossed polarizers and utilizing a positive-negative anisotropy material. Such arrangement is transmissive in the twisted state.

In this chart, the abscissa is time in seconds, each subdivision being 1.5 secs and the ordinates are intensity of transmitted light in arbitrary units. The nematic material which is employed is a mixture, as tabulated hereinbelow, of the following species of the above set forth structural formula.

Table

| Quantity By Weight of mixture | R | R' |
|---|---|---|
| 1. about 21% | Hexyl | Pentyl |
| 2. about 14% | Pentyl | Heptyl |
| 3. about 26% | Heptyl | Pentyl |
| 4. about 22% | Butyl | Pentyl |
| 5. about 17% | Hexyl | Pentyl |

The leftmost portion of the trace shows the effect of the application of a d.c. voltage (30 V d.c. in the trace) which aligns the molecules of the nematic material perpendicular to the planes of the electrodes, FIG. 2, i.e., the light is extinguished. The next portion of the trace shows what happens when the d.c. voltage is removed and an a.c. voltage is applied (such as, for example, 120 volts a.c. at 10 kHz). In the latter case, a relaxation occurs which is driven by the a.c. voltage, such relaxation causing the cell to assume the twisted configuration FIG. 1. In this situation, all of the molecules of the nematic material are parallel to the plane of the electrodes (but with a helical twist).

The next portion shows the effect of removing the a.c. voltage and the reapplication of the d.c. voltage.

Here again, the molecules assume positions perpendicular to the planes of the electrodes and no light is transmitted. The next portion shows the d.c. voltage removed and no a.c. voltage applied. In this situation, the cell relaxes freely to the wall orientation.

It has been found that using a positive-negative anisotropy material according to the invention, overall, the reduction in time is a factor of about 10. For the initial rate of relaxation which is determined by the mathematical formulas set forth above, the reduction is by a factor of 400 which is consistent with theory. In a parallel rather than a twisted configuration, the overall time is closer to the theoretical result.

Figure 5:
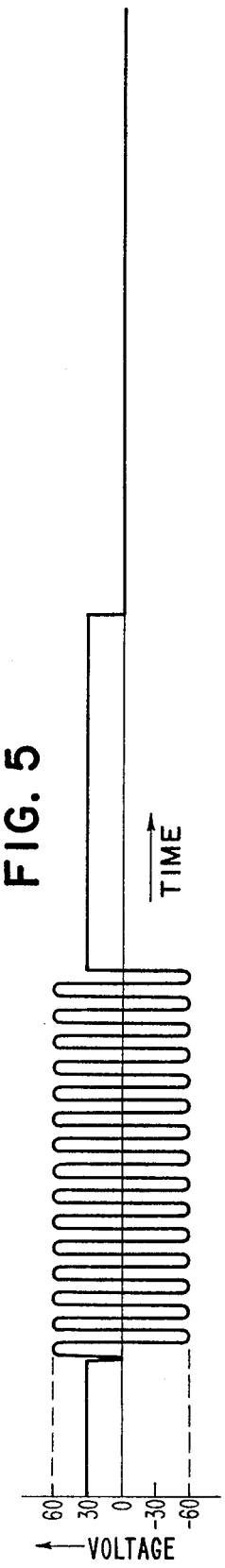
FIG. 5 depicts the applied voltage waveform to provide the trace of transmitted light as shown in FIG. 4.

FIG. 5 depicts the voltage waveform which is applied to the cell to provide the strip chart trace of transmitted light as shown in FIG. 4.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. An optical device comprising:
   a cell comprising;
   a pair of electrodes adapted to be connected to a voltage generator, and
   a film of nematic fluid contained between said electrodes;
   said nematic fluid being a material which is characterized by an intrinsic reversal in sign in its dielectric anisotropy, said sign being positive when the frequency of an applied electric field is below, or negative when the frequency is above the dielectric reversal frequency of said nematic fluid;
   a pair of crossed polarizers, said cell being disposed between said polarizers.

2. An optical device as defined in claim 1 wherein said nematic material is a compound and mixtures of compounds represented by the following general structural formula:

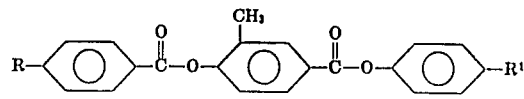

wherein R and R' are radicals selected from the group consisting of alkyl radicals having one to 12 carbon atoms.

3. An optical device as defined in claim 2 wherein said nematic material consists of the following mixture of species of said compounds represented by said structural formula:

| Quantity By Weight of composition | R | R' |
|---|---|---|
| about 21% | Hexyl | Pentyl |
| about 14% | Pentyl | Heptyl |
| about 26% | Heptyl | Pentyl |
| about 22% | Butyl | Pentyl |
| about 17% | Hexyl | Pentyl |

* * * * *